United States Patent Office 3,088,340
Patented May 7, 1963

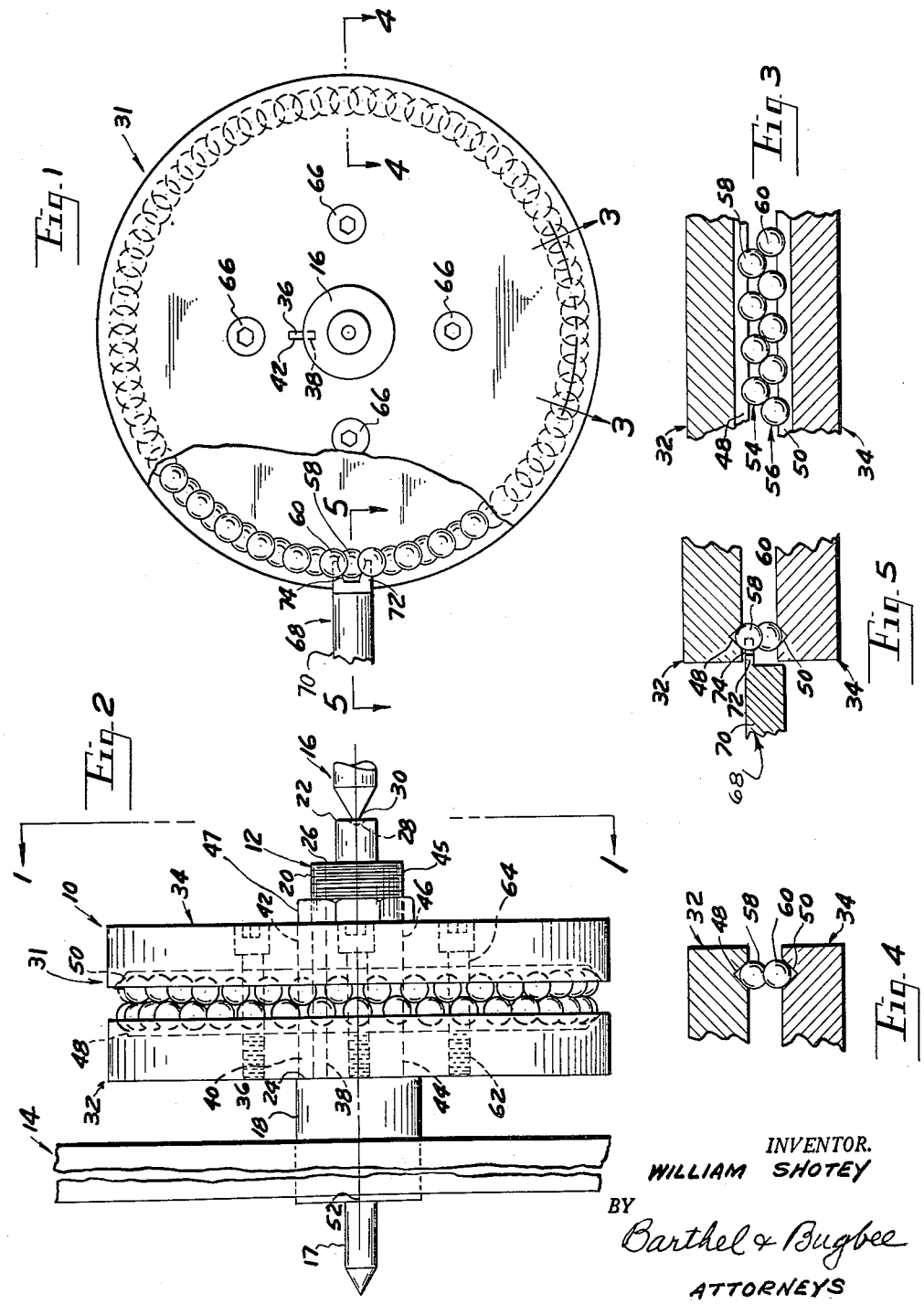

3,088,340
VARIABLE INDEXING DEVICE
William Shotey, 4004 Lapham, Dearborn, Mich.
Filed Nov. 25, 1960, Ser. No. 71,596
8 Claims. (Cl. 74—813)

This invention relates to indexing devices and, in particular, to variable indexing devices.

One object of this invention is to provide a variable indexing device wherein the number of steps or stations indexed per revolution of the device can be varied at the desire of the operator, yet can even include a non-factorable number of steps or stations by simple yet positive means which is free from errors of backlash or the like.

Another object is to provide a variable indexing device of the foregoing character wherein the variation of the number of steps or stations indexed per revolution of the device is accomplished by the addition or subtraction of one or more balls from a double-row circumferentially-arranged ball set or assembly urged into tight and immovable engagement with one another between abutment plates or discs containing axially-spaced facing ball races.

Another object is to provide a variable indexing device, as set forth in the object immediately preceding, wherein the number of steps or stations to be indexed may also be varied by varying the radii or diameters of the ball races from the axis of rotation of the plates or discs, as well as by varying the diameters of the balls used in the ball races.

Other objects and advantages of the invention will become apparent during the course of the following description of the accompanying drawing, wherein:

FIGURE 1 is a diagrammatic vertical section, taken along the line 1—1 in FIGURE 2 and partly broken away, of a variable indexing device, according to one form of the invention, showing a horizontal indexing stop member in position;

FIGURE 2 is a front elevation of the indexing device shown in FIGURE 1, with the horizontal indexing stop member omitted;

FIGURE 3 is a fragmentary developed horizontal section taken along the arcuate line 3—3 in FIGURE 1;

FIGURE 4 is a fragmentary horizontal section taken along the line 4—4 in FIGURE 1; and FIGURE 5 is a fragmentary horizontal section taken along the line 5—5 in FIGURE 1.

Referring to the drawing in detail, FIGURES 1 and 2 show diagrammatically one form of indexing device, generally designated 10, according to the invention as including a rotary stepped shaft 12 supported at one end in a bearing head 14 and at its opposite end on a tapered dead center shaft 16. The shaft 12 on the opposite side of the bearing head 14 has a reduced diameter extension portion 17, which in turn carries a conventional lathe dog or other suitable means drivingly engaging a conventional peripherally-notched driving disc (not shown) on a shaft carrying the workpiece (not shown). Such driving arrangements are familiar to those skilled in the turning lathe art and hence require no further description.

The stepped shaft 12 includes large, intermediate and small diameter portions 18, 20 and 22 separated from one another by annular shoulders 24 and 26. The small diameter portion 22 at its end contains a center recess 28 engaged by the point 30 of the tapered dead center shaft 16 mounted in a conventional dead center head lathe or other suitable support, as found in conventional machine tools, such as lathes.

Mounted on the intermediate diameter portion 20 of the stepped shaft 12 is an indexing unit, generally designated 31, including two axially-spaced ball-race discs 32 and 34 driven by a driving key 36 mounted in the keyway 38 in the intermediate shaft portion 20 and drivingly engaging the aligned keyways 40 and 42 in the axial central bores 44 and 46 of the discs 32 and 34. The outer end part 45 of the intermediate shaft 20 is preferably threaded to receive a retaining nut 47 which holds the indexing unit 31 firmly in position against the annular shoulder 24. The ball-race discs 32 and 34, as their names indicate, contain annular ball races 48 and 50 of V-shaped cross-section disposed on the same radii from the axis of rotation 52 of the shaft 12 (FIGURES 1 and 5). Mounted in the opposed ball races 48 and 50 are two sets 54 and 56 respectively of axially-spaced precision balls 58 and 60 respectively (FIGURES 1 and 3). The balls 58 and and 60 are high precision balls, such as ball bearing balls, and accordingly their diameters are the same within the minute tolerances established for such high precision balls.

The ball race discs 32 and 34 are bored and threaded in alignment as by circumferentially-spaced threaded holes 62 in the ball race disc 32 and circumferentially-spaced smooth-bore holes 64 in the ball race discs 34. Bolts 66 mounted in the holes 62, 64 urge the discs 32 and 34 toward one another and accordingly force the two sets 54 and 56 of balls 58 and 60 tightly into engagement with one another (FIGURE 3). The greater the number of balls in the sets 54 and 56, the less the individual balls 58 and 60 will interpenetrate and the farther apart will be the discs 32 and 34. Conversely, the smaller the number of balls in the ball sets 54 and 56, the greater will be the interpenetration of the individual balls 58 and 60 of the two sets and the closer will be the ball race discs 32 and 34. By varying the number of balls in each set, the number of steps or stations indexed per revolution of the shaft 12 can be correspondingly varied in the above manner, and nevertheless the tight interengagement of the balls of the two sets 54 and 56 insures the even and accurate circumferential spacing of the balls 58 and 60 of each set.

Engagement with the balls 58 or 60 of either of the ball sets 54 or 56 is made by means of any suitable indexing stop member, such as the indexing stop member 68 shown in full lines in its horizontal position in FIGURES 1 and 5 and in dotted lines in its optional vertical position in FIGURES 1 and 2. It will be understood that the indexing stop member 68 can be mounted in any desired location around the circumferences of the discs 32 and 34, either in the horizontal position shown, or in inclined positions therebetween. Each indexing stop member 68 may take anyone of several forms, the form shown in FIGURES 1 and 5 consisting of a shaft 70 of either square or circular cross-section having a centrally offset portion 72 containing a ball-engaging notch 74 of truncated V-shaped cross-section or profile so as to accurately engage the peripheries of the individual balls 58 or 60 of the ball sets 54 or 56. The indexing stop member 68 is preferably mounted accurately in a bearing or bearings (not shown) permitting axial adjustment motion and inhibiting tangential or rocking motion.

It will be apparent from FIGURES 1 and 2 that the number of steps or stations to be indexed will vary, as stated above, according to the number of balls 58 or 60 in each set 54 or 56, and this in turn depends not only on the diameters of the balls 58 and 60 but also on the diameters, from the axis of rotation 52 of the shaft 16, of the ball races 48 and 50. The greater the diameters of the ball races 48 and 50, the greater the number of balls 58 and 60 of a given diameter accommodated in the ball sets 54 and 56. The smaller the diameters of the balls 58 and 60, the greater the number of balls accommodated in ball races 48 and 50 of a given diameter. The number of balls in each set 54 or 56 may be varied by inserting or removing balls, within a range limited by the range of interpenetration of the balls relatively to one another (FIGURE 3), since the circumferential spacing of the balls 58 or 60 must always be less than the diameters of the balls 58 or 60 themselves, or the two sets 54 and 56 will merge into a single set with their centers located in a common plane perpendicular to the axis of rotation 52.

In the operation of the invention, let it be assumed that a suitable number of balls 58 and 60 of a satisfactory diameter for the number of steps or stations to be indexed has been mounted in the ball races 48 and 50 and the discs 32 and 34 brought together by tightening the bolts 66 in order to cause tightly fitting interpenetration of the balls 58 and 60 of the ball sets 54 and 56. The number of balls chosen in each set 54 or 56 is the number of steps or stations to be indexed. The indexing stop member 68 is then caused to move in and out along its longitudinal axis as the discs 32 and 34 are rotated unitarily, causing indexing to take place each time the notch 74 of the indexing member 68 reaches its farthest inward motion into engagement with its particular ball 58, as shown in FIGURES 1 and 5. The subsequent rotation of the discs 32 and 34 to the next point where the notch 74 again snugly engages the next ball 58 determines the next indexed step or station, and so on for an entire revolution of the discs 32 and 34. Thus, in this manner the indexing device 10 can be adjusted to index a number of stations or steps per revolution incapable of factoring by whole numbers, for example, into 11, 13, 17 and the like. Moreover, by adding or subtracting balls, the number of steps or stations to be indexed is quickly, easily and precisely varied, as is the substitution of larger or smaller diameter balls 58 and 60, or the use of larger or smaller diameter ball races 48 and 50.

It will also be evident that the effective indexing may be varied in multiples of the number of balls in each set 54 or 56 by causing the indexing stop member 68 to actuate follower or responsive mechanism every two, three, four, five or other multiples, such as by the use of a stepping or ratchet electric relay or mechanical ratchet stepping mechanism.

Moreover, the indexing stop member 68 is preferably provided with a handle or with an operating lever (not shown) by which it is moved back and forth into and out of locking engagement with each ball 58 and held in its locked position while machining or other operations are being carried out while controlled by the indexing device 10. For example, the indexing device 10 is conveniently mounted on the carriage of a conventional milling machine with the rotary stepped shaft 12 carrying a cylindrical gear blank disposed adjacent and in line with a rotary gear tooth milling cutter. As a consequence, when the carriage is fed toward the milling cutter, the latter cuts in the blank a groove representing the root profile of the gear tooth while the indexing stop 68 holds the abutment discs 32 and 34 and their rollable elements 58 and 60 momentarily stationary. After the first cut is taken, the indexing stop member 68 is retracted, the abutment members or discs 32 and 34 are rotated one step corresponding to a tooth interval of the gear, the indexing stop member 68 is again advanced into locking position with the next ball 58, and the milling machine carriage again moved relatively to the milling cutter to complete the profile of the first tooth, and so on until all of the teeth of the gear are cut. It will be obvious that if the number of balls 58 or 60 engaged by the indexing stop member 68 is factorable, the indexing stop member may be caused to halt at a number of steps corresponding to these factors. For example, a set of 20 balls may be used to index two steps, four steps, five steps, ten steps or 20 steps merely by skipping the necessary number of balls in order to bring about indexing at the proper intervals.

What I claim is:

1. A variable indexing device comprising a supporting structure, a pair of coaxial abutment members rotatably mounted on said supporting structure in axially-spaced relationship, said abutment members having facing portions with aligned opposed rollable element races disposed thereon in orbital paths encircling the axis of rotation of said abutment members, two sets of multiple circumferentially-spaced rollable elements disposed in arcuately-movable self-adjusting relationship respectively in the two opposed races and having multiple circumferentially-spaced rollable elements disposed in staggered interpenetrating tight engagement with one another, means engaging said abutment members for holding set two sets of rollable elements in staggered interpenetrating tight engagement with one another, and an indexing stop member mounted adjacent said abutment members in alignment with the rollable elements of one set thereof and movable into and out of successive halting engagement with said last-mentioned rollable elements, whereby to cooperatively effect high precision step-by-step indexing of said abutment members during rotation thereof.

2. A variable indexing device, according to claim 1, wherein said abutment members are movable axially relatively to one another to vary the width of the axial space therebetween whereby to vary the space available for accommodating the number of rollable elements in each set and consequently to enable varying the number of indexing steps per revolution of said abutment members.

3. A variable indexing device, according to claim 1, wherein the rollable element races comprise orbital recesses, and wherein the rollable elements are rollably mounted for travel arcuately along said recesses.

4. A variable indexing device, according to claim 3, wherein the orbital recesses comprise annular grooves of approximately V-shaped cross-section.

5. A variable indexing device, according to claim 1, wherein the indexing stop member has a rollable-element-engaging portion consisting of a recess snugly fitting the rollable elements engaged thereby.

6. A variable indexing device, according to claim 5, wherein the recess comprises a notch.

7. A variable indexing device, according to claim 6, wherein the notch is of approximately V-shaped cross-section.

8. A variable indexing device, according to claim 5, wherein the indexing stop member is reciprocably mounted relatively to said supporting structure.

References Cited in the file of this patent

UNITED STATES PATENTS

| | | |
|---|---|---|
| 632,952 | Tanner | Sept. 12, 1899 |
| 2,233,950 | Lepetit | Mar. 4, 1941 |
| 2,959,065 | Musser | Nov. 8, 1960 |

FOREIGN PATENTS

| | | |
|---|---|---|
| 294,080 | Great Britain | July 19, 1928 |